United States Patent [19]
Gage et al.

[11] Patent Number: 6,035,405
[45] Date of Patent: Mar. 7, 2000

[54] SECURE VIRTUAL LANS

[75] Inventors: William W. A. Gage, Stittsville; Martin Wollensak, Nepean; Lee Himbeault, Calgary, all of Canada

[73] Assignee: Nortel Networks Corporation, Montreal, Canada

[21] Appl. No.: 08/996,159

[22] Filed: Dec. 22, 1997

[51] Int. Cl.[7] .................................................. G06F 12/14
[52] U.S. Cl. ............................ 713/201; 709/227; 380/25
[58] Field of Search .................................... 713/201, 200, 713/202; 709/227, 218, 219, 238, 203, 220, 223, 245, 249, 246, 250, 1, 237, 229, 224, 242, 228; 370/552, 16, 60, 94.01, 404; 380/23, 25, 48, 28; 345/356

[56] References Cited

U.S. PATENT DOCUMENTS

| | | | |
|---|---|---|---|
| 4,823,338 | 4/1989 | Chan et al. | 370/522 |
| 5,394,402 | 2/1995 | Ross | 370/94.1 |
| 5,473,599 | 12/1995 | Li et al. | 370/16 |
| 5,588,119 | 12/1996 | Vincent et al. | 709/200 |
| 5,600,644 | 2/1997 | Chang et al. | 370/404 |
| 5,621,726 | 4/1997 | Murakimi | 370/60 |
| 5,751,812 | 5/1998 | Anderson | 380/48 |
| 5,751,967 | 5/1998 | Raab et al. | 709/228 |
| 5,752,003 | 5/1998 | Hart | 395/500 |
| 5,764,887 | 12/1995 | Kells et al. | 713/200 |
| 5,802,047 | 5/1996 | Kinoshita | 370/359 |
| 5,802,306 | 10/1995 | Hunt | 709/228 |
| 5,874,964 | 10/1996 | Gille | 345/356 |
| 5,892,912 | 10/1996 | Suzuki et al. | 709/218 |
| 5,892,922 | 2/1997 | Lorenz | 709/238 |
| 5,940,597 | 10/1997 | Chung | 709/242 |
| 5,974,452 | 1/1997 | Karapetkov et al. | 709/218 |

*Primary Examiner*—Dennis M. Butler
*Assistant Examiner*—Rijue Mai

[57] ABSTRACT

The present invention discloses a method for securely adding a new end station to a local area network (LAN) segmented into a number of virtual local area networks (VLANs). The invention is applicable to various types of LANs such as Ethernet and token ring. The LAN comprises an authentication server (AS) which interacts with each new end station before connection to a VLAN is allowed. The method involves the AS administering a test to the new end station, which may involve prompting the new end station for a password or asking it to encrypt a given number using a secret algorithm known only to the new end station and to the AS. The AS examines the results of this test and determines whether the new end station is permitted to join the VLAN. For added security, the new end station can verify authenticity of the AS by administering a test of its own, which may consist of prompting the AS for a password of its own or asking it to encrypt a new number, the new end station subsequently determining whether the AS is indeed genuine before beginning to transmit any further information. In this way, an end station cannot join a VLAN without authentication by the AS and a legitimate end station can verify whether the test it is asked to pass comes from a legitimate source, thereby avoiding network security breaches.

42 Claims, 4 Drawing Sheets

SECURE VIRTUAL LANS

FIELD OF THE INVENTION

This invention relates to local area networks, and specifically to a method for improving the security of information circulating within a virtual local area network.

BACKGROUND OF THE INVENTION

Conventional local area networks (LANs) can be thought of as comprising a number of end stations (or terminals), connected to each other by a combination of links and switches. In addition, distant switches can be connected by virtual connections (VCs) passing through asynchronous transfer mode (ATM) switches. Such an extension of a LAN is often referred to as a LAN emulation over ATM (LANE) environment. As the number of end stations in the LAN or LANE environment grows, congestion of traffic and security issues become grave concerns of administrators of such networks.

Segmentation of the LAN or LANE environment into a number of virtual LANs (VLANs) has been used by network administrators to relieve traffic congestion and to provide security of information travelling within the network. The security provided by traditional VLANs is based on two basic principles used for transmitting data packets within the network. For one, broadcast and multicast traffic is transmitted only to end stations that are members of the VLAN. In this case, a known broadcast or multicast address can be shared among intended recipients. Secondly, unicast traffic is transmitted only between the source and destination end stations, although the location of an intended recipient can often only be determined by first broadcasting a "discovery" packet to other end stations within the VLAN. Clearly, network security in the prior art is based on the premise that data is transmitted only to those end stations that are authorized to see the data, thereby avoiding security breaches due to inadvertent or malicious snooping by end stations outside the VLAN. A serious flaw in this approach is that end stations can join a VLAN with little or no authentication by the network.

Membership in a VLAN can be defined by user name, access port identifier, end station media access control (MAC) address or Internet Protocol (IP) sub-network address. When membership in a VLAN is defined by access port identifier, a network administrator assigns the physical ports (e.g. on an Ethernet switch or hub) that constitute elements of a VLAN. However, this does not prevent an intruder from disconnecting a legitimate end station and connecting an illegitimate one to the same physical port. Once connected, the illegitimate end station has access to possibly confidential information circulating within the VLAN.

VLAN membership can also defined by referring to a unique 48-bit MAC address that is assigned to each end station during manufacture. In this case, the network administrator defines the MAC addresses of the end stations that constitute elements of the VLAN. When an end station is connected and begins transmitting data packets, the source MAC address contained in each data packet is used to determine the VLAN where the end station belongs. Unfortunately, this does not prevent an intruder from connecting an illegitimate end station to the network and inserting the MAC address of a legitimate end station into its data packets. Having successfully "emulated" a legitimate end station, the illegitimate end station gains access to restricted information being communicated in the VLAN.

Finally, the network administrator may also define the 32-bit IP address blocks or user names of the end stations that are permitted to be members of the VLAN. The IP address and user name act similarly to the MAC address, and again, by inserting the identity of a legitimate end station into its data packets, an illegitimate end station can gain access to restricted data.

It would thus be of prime importance to provide a method of ensuring that unauthorized end stations cannot connect to a VLAN. Furthermore, in the case where an authentication mechanism would be provided to alleviate this difficulty, it would be beneficial to ensure that unauthorized switches cannot emulate such an authentication mechanism.

SUMMARY OF THE INVENTION

It is an object of the present invention to mitigate or obviate one or more disadvantages of the prior art.

Therefore, the invention may be summarized in accordance with a first broad aspect as a local area network, comprising a plurality of end stations and an authentication server, the LAN being segmented into a plurality of virtual local area networks (VLANs), each VLAN comprising at least one member end station, wherein the authentication server keeps track of which end stations are members of which VLAN, keeps track of which end stations are authorized to join which VLAN and performs authentication of end stations joining a VLAN.

The invention may be summarized in accordance with a second broad aspect as a method for securely adding a new end station to a local area network (LAN), the LAN comprising a plurality of end stations and an authentication server (AS), the LAN being segmented into a plurality of virtual local area networks (VLANs), each VLAN comprising at least one member end station, wherein the authentication server keeps track of which end stations are members of which VLAN, keeps track of which end stations are permitted to join which VLAN and performs authentication of end stations joining a VLAN, the method comprising the new end station sending to the AS a message identifying both the new end station and a desired VLAN; the new end station taking an authentication test; and upon successful authentication of the new end station, the AS sending to the new end station a message indicating that the new end station has been permitted to join the desired VLAN.

The invention may be summarized in accordance with a third broad aspect as a method for securely adding a new end station to a local area network (LAN), the LAN comprising a plurality of end stations and an authentication server (AS), the LAN being segmented into a plurality of virtual local area networks (VLANs), each VLAN comprising at least one member end station, wherein the authentication server keeps track of which end stations are members of which VLAN, keeps track of which end stations are permitted to join which VLAN and performs authentication of end stations joining a VLAN, the method comprising the new end station sending to its switch a message identifying both the new end station and a desired VLAN; the AS and new end station taking an authentication test; upon successful authentication of the new end station, the AS sending to the new end station a message indicating that the new end station has been permitted to join the desired VLAN; and upon successful authentication of the AS, the new end station joining the desired VLAN.

BRIEF DESCRIPTION OF THE DRAWINGS

The preferred embodiment of the present invention will now be described with reference to the attached drawings, in which.

DETAILED DESCRIPTION OF THE PREFERRED EMBODIMENT

Figure 1:
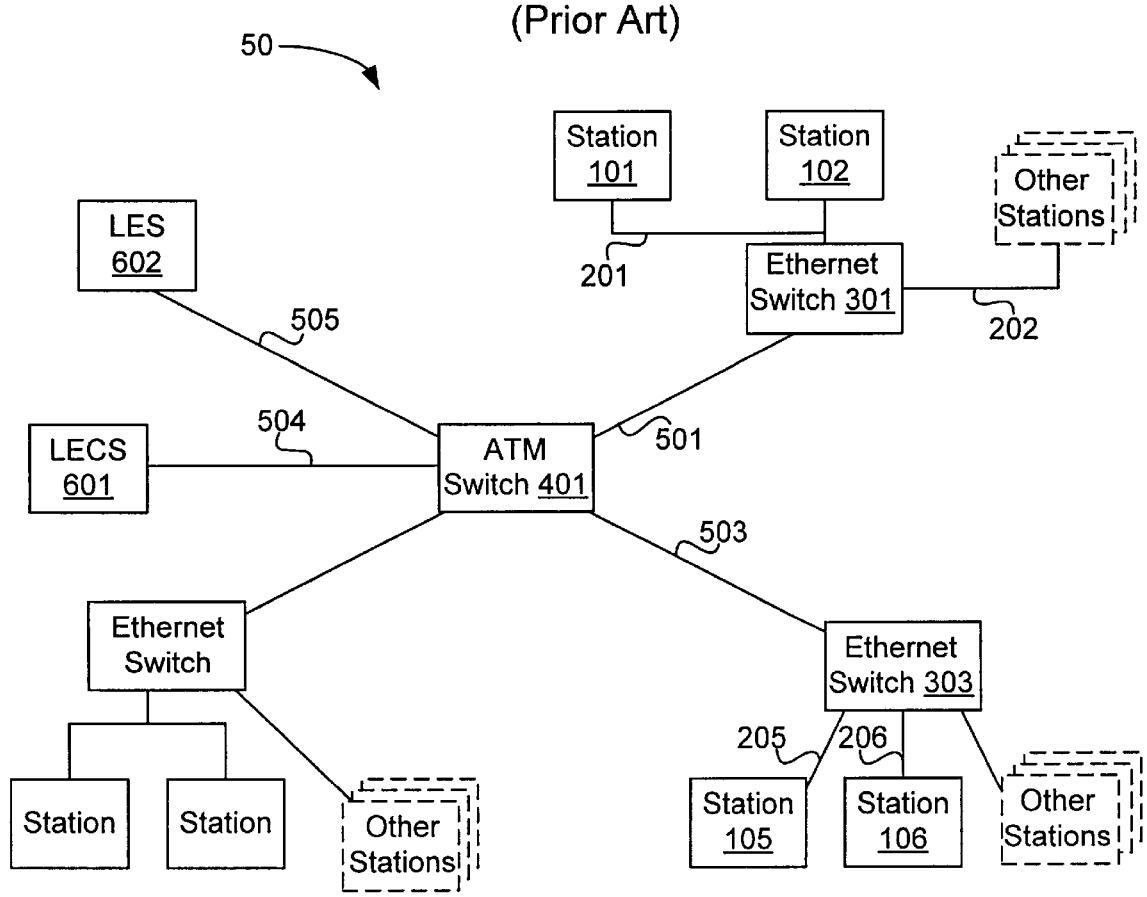
FIG. 1 is a block diagram of a prior art LANE environment.

FIG. 1 shows a local area network 50 comprising a plurality of interconnected end stations 101, 102, 105, 106 such as personal computers, workgroup servers or mainframe computers. Although for illustrative purposes the network is assumed to be an Ethernet LAN, the present invention applies equally well to other types of LANs, e.g., token ring, high-level data link control (HDLC) and Apple-Talk.

In an Ethernet local area network, a frame sent by a transmitting end station in the LAN contains a header identifying the transmitting end station and an intended recipient end station (using, e.g., source and destination MAC addresses), as well as information to be exchanged. The Ethernet frames can be transmitted using the Carrier Sense Multiple Access with Collision Detection (CSMA-CD) protocol or any other media-access control protocol known or used in the art. In FIG. 1, the two end stations 101, 102 sharing an Ethernet link 201 can communicate with each other without additional interfacing, as any frame transmitted on a given shared link is "seen" by all end stations connected to that link.

An Ethernet switch 301 connects multiple Ethernet links 201, 202 and enables communication between end stations appearing on the various Ethernet links. The Ethernet links 201, 202 emanate from the Ethernet switch 301 in a star arrangement and the Ethernet switch keeps track of which end stations are connected to which link. When an Ethernet frame is received by the Ethernet switch 301, it examines the header and transmits the frame over the Ethernet link connected to the intended recipient; the frame is not transmitted to any of the other links, thereby reducing traffic congestion on the Ethernet links. In some instances, end stations may be connected to their Ethernet switch with a dedicated Ethernet link to avoid sharing the link bandwidth with other end stations, thus providing the end station with the maximum possible performance. An example of this is end stations 105, 106 connected to Ethernet switch 303 by dedicated links 205, 206.

In a large local area network, it may be necessary to introduce several Ethernet switches in order to further reduce congestion on Ethernet links. Although there a number of mechanisms for interconnecting Ethernet switches in a network, LAN emulation over ATM (LANE) represents a common approach. Ethernet switches 301, 303 communicate via virtual connections (VCs) through an ATM network consisting of an ATM switch 401, in addition to ATM links 501, 503 joining the Ethernet switches to the ATM switches. In a more complex network, there may be several ATM switches interconnected by additional ATM links.

The Ethernet switches keep track of which end stations are connected to which of its local Ethernet links, and also knows which end stations are connected to other Ethernet switches in the network. A LAN emulation server (LES) 602, connected to the network by an ATM link 505, comprises an updated table indicating which end stations are connected to which Ethernet switches, so that information contained in the Ethernet switches 301, 303 may be kept up-to-date. A LAN emulation configuration server (LECS) 601, responsible for "configuring" the network to which it is connected by an ATM link 504, handles initial connection of new end stations into the LANE environment.

When an Ethernet frame is received from an end station by an Ethernet switch, the header will be examined and if the recipient is connected to one of its local Ethernet links, the Ethernet switch transmits the frame over the appropriate Ethernet link. If, however, the recipient is connected to another Ethernet switch, the frame is transmitted over the appropriate ATM VC to the destination Ethernet switch. Upon receipt of the frame over the ATM VC, the destination Ethernet switch performs a normal match of destination MAC address to Ethernet link and forwards the frame over the appropriate Ethernet link to the destination end station.

If there are too many end stations in a LAN, multicast and broadcast traffic can become major contributors to network congestion. To alleviate this problem, the network is segmented into a number of smaller, "virtual" sub-networks (virtual LANS, or VLANs). As hinted at by the term "virtual", end stations designated as belonging to a particular VLAN do not all have to connect to the one Ethernet switch nor do all end stations connected to an Ethernet switch have to belong to the one VLAN. Such partitioning of the network is transparent to the end stations. Each Ethernet switch, on the other hand, comprises an internal database to keep track of which end stations belong to which VLANs.

Figure 2:
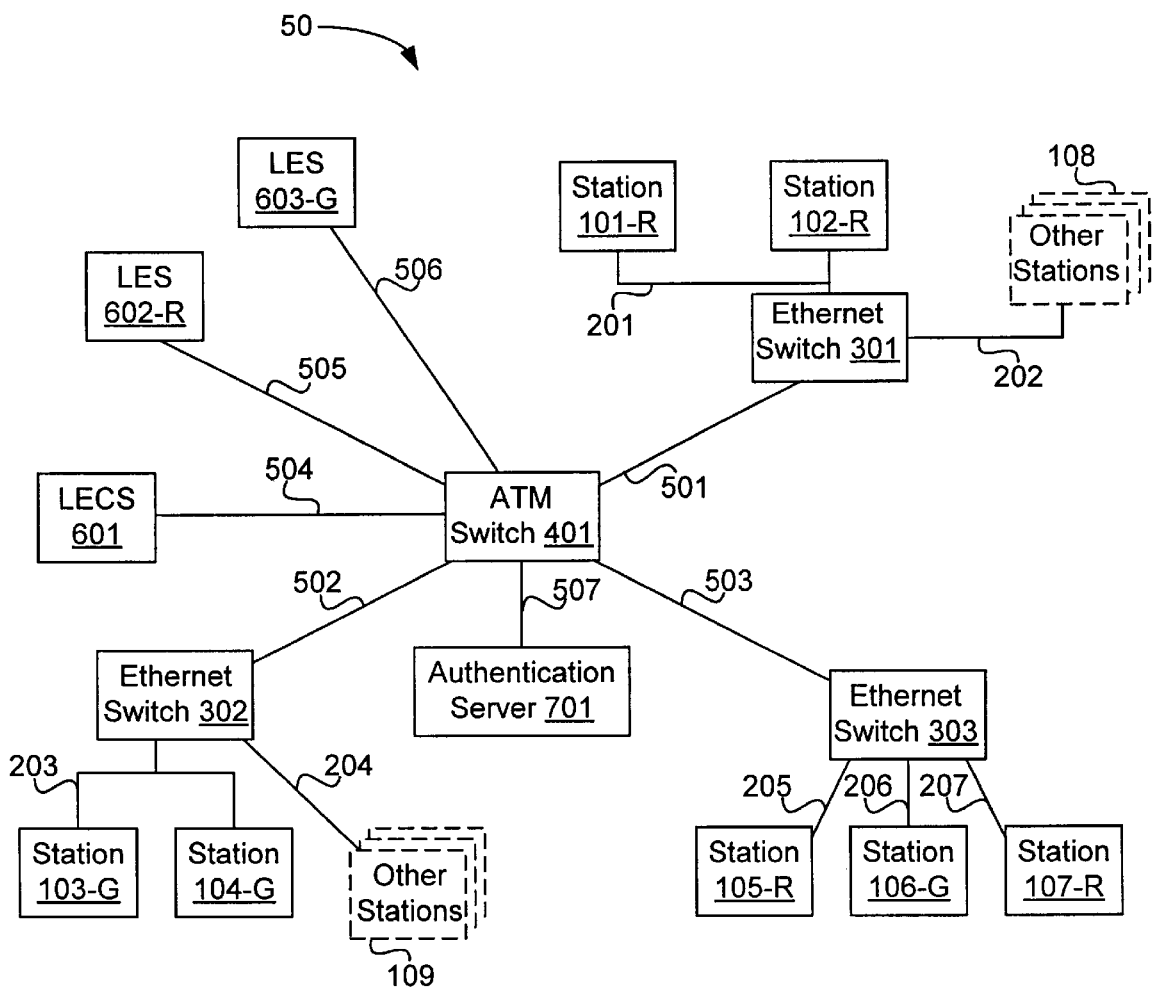
FIG. 2 is a block diagram of a secure LANE environment including two virtual local area networks, in accordance with the preferred embodiment of the present invention.

In FIG. 2 is shown an exemplary LANE environment 50 in accordance with the present invention. Two virtual LANs can be identified: a "red" VLAN, consisting of end stations 101-R, 102-R and 105-R, and a "green" VLAN, consisting of end stations 103-G, 104-G and 106-G. Other groups of end stations 108, 109 do not belong to either VLAN. Physically, end stations 101-R and 102-R share an Ethernet link 201 and are connected to an Ethernet switch 301. From Ethernet switch 301 also emanates an Ethernet link 202 connecting end stations 108. Similarly, an Ethernet switch 302 connects end stations 103-G and 104-G via a shared Ethernet link 203 and end stations 109 via another Ethernet link 204. A third Ethernet switch 303 connects end stations 105-R and 106-G via respective dedicated Ethernet links 205 and 206. Ethernet switch 303 also physically connects an end station 107-R via a dedicated Ethernet link 207. The end station 107-R is not a member of either the red or the green VLAN, but presumably intends to join the red VLAN.

A LAN emulation configuration server (LECS) 601 contains an internal database storing a record of each VLAN and the end stations permitted to join the VLANs. As end stations are powered on or reconfigured, the Ethernet switches register the end stations wishing (and permitted) to join a particular VLAN with a LAN emulation server (LES, 602-R for the red VLAN and 603-G for the green VLAN); registration with an LES constitutes membership within the corresponding VLAN. Virtual connections joining the Ethernet switches 301, 302, 303, the LECS 601 and the LAN emulation servers 602-R, 602-G are established by an ATM switch or hub 401, and communication is effected via ATM links 501 through 506, respectively.

A multicast or broadcast frame received from an end station that is a member of, for example, the red VLAN, is forwarded by the Ethernet switch serving the end station to a broadcast and unknown server (BUS) function associated with LES 602-R. The LES 602-R then forwards the frame to all Ethernet switches in the network that have end stations that are members of the red VLAN, i.e., Ethernet switches 301 and 303. The Ethernet switches 301 and 303 in turn forward the multicast or broadcast frame only to those Ethernet links that are connected to members of the red VLAN, i.e., Ethernet links 201 and 205. In this way, multicast and broadcast frames are prevented from being transmitted to end stations outside the VLAN where the frame originated, thereby relieving traffic congestion within the LAN as a whole.

A primary function of the LECS 601 is to configure the VLANs, i.e., to inform new end stations wishing to join a particular VLAN of the address where the LES for that VLAN can be found. In conventional networks, however, no authentication of the new end stations is performed. By using, say, the MAC address of an end station permitted to join a particular VLAN, a possibly unauthorized end station can register with the VLAN's LES, leading to the previously discussed security breaches.

In accordance with the present invention, an authentication server (AS) 701, connected to the network via an ATM link 507, provides security mechanisms for authenticating end stations when they attempt to join a desired VLAN. The AS 701, for its part, is responsible for checking the validity of new end stations and not letting them register with any LES unless they pass an authentication "test", which in an exemplary embodiment is administered using a key-based challenge-response algorithm. A network administrator can easily ensure that only the AS 701 and one new end station at a time possess appropriate keys for administering and passing the test. It is within the scope of the present invention to provide different types of authentication tests, such as techniques based on passwords, synchronized security cards, voice printing or finger printing. The key consideration in all cases is that successful authentication is possible only if the new end station is genuinely authorized to join the desired VLAN.

If the AS 701 is connected to the network through an Ethernet link and switch, the AS should not share its Ethernet link with other end stations to ensure that traffic directed to the AS is seen only by the AS. The AS may be implemented as a stand-alone entity to provide enhanced security for the algorithms and data it contains, or may be integrated with the LECS 601.

Figure 3:
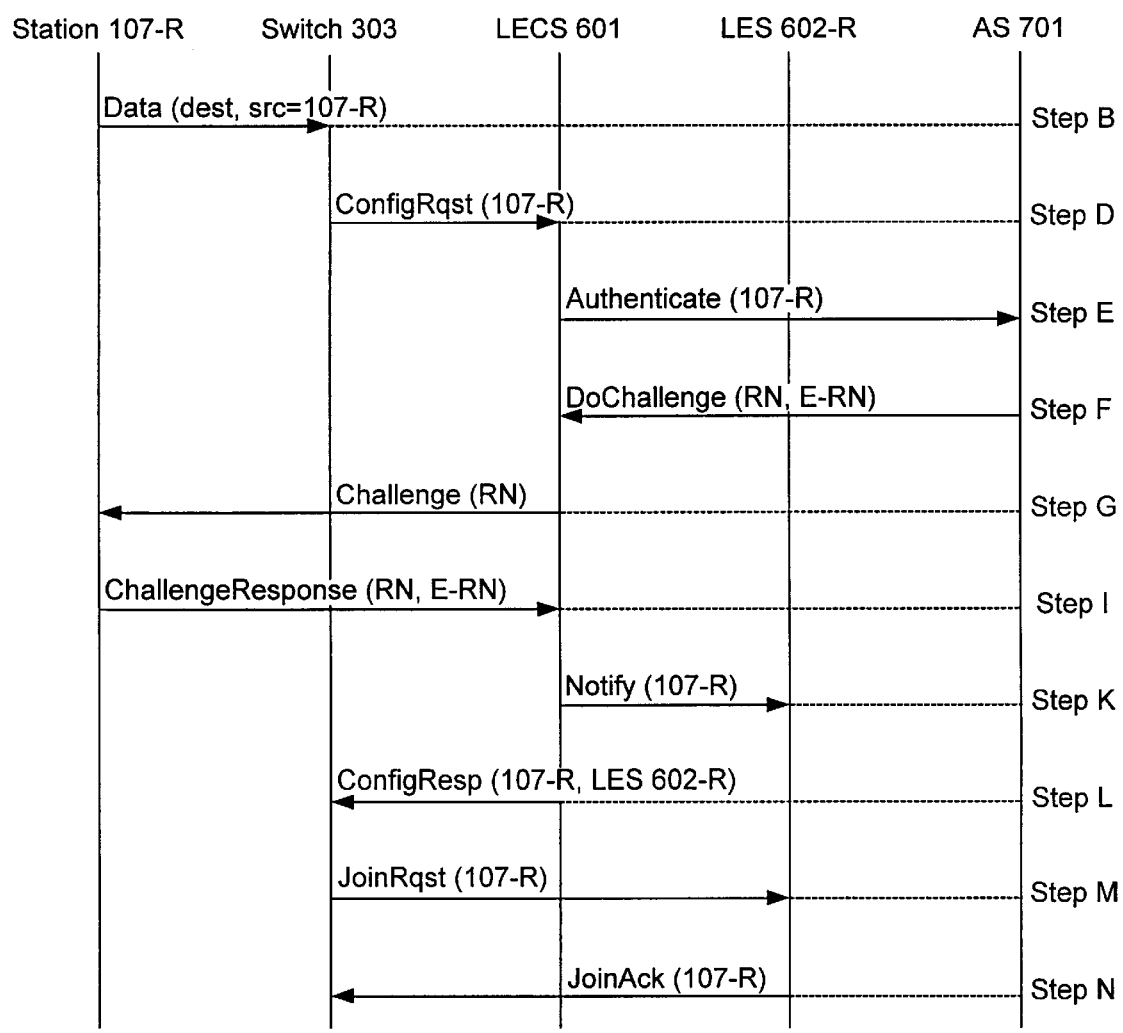
FIG. 3 is a message flow diagram representing end station authentication in the network of FIG. 2.

A sequence of steps for end station 107-R to join the red VLAN according to the present invention is now described with additional reference to FIG. 3, in which only the steps requiring transmission of information between network components have been illustrated. It is to be understood that an analogous algorithm applies in the case of a new end station wishing to join the green VLAN.

Step A. End station 107-R constructs an Ethernet frame consisting of a frame header comprising a destination address and a source address (e.g., the MAC address of end station 107-R), as well as data to be exchanged. The destination address may be the MAC address of the destination end terminal or a known broadcast address.

Step B. End station 107-R transmits the frame over Ethernet link 207 to Ethernet switch 303 in the form of a "Data" message, using the CSMA-CD protocol.

Step C. Ethernet switch 303 extracts the source address (the MAC address of end station 107-R) from the Ethernet frame and consults an internal table to determine the virtual LAN (and LES) associated with the source address.

Step D. If Ethernet switch 303 cannot find an associated LES by consulting its internal table, Ethernet switch 303 sends a query, in the form of a "ConfigRqst" message, to the LECS 601 asking for the identity of the LES associated with end station 107-R.

Step E. LECS 601 sends an "Authenticate" message to AS 701 requesting authentication of end station 107-R.

Step F. Using a challenge-response authentication algorithm, AS 701 generates a plain number, such as a random number RN, and encrypts it using a secret key known only to the AS 701 and end station 107-R to produce E-RN. Both RN and E-RN are returned to the LECS 601 as a "DoChallenge" message. The secret key used to generate E-RN is never revealed by the AS 701.

Step G. The LECS 601 creates a frame containing a challenge to end station 107-R that includes RN received from AS 701 but does not include E-RN. The frame is then sent in a "Challenge" message from the LECS 601 to the Ethernet switch 303 and subsequently relayed to end station 107-R.

Step H. End station 107-R encrypts RN received in the challenge using its secret key and the same authentication algorithm used by the AS 701.

Step I. End station 107-R responds to the challenge with a "ChallengeResponse" message containing RN received from the LECS 601, along with its version of E-RN. The challenge response is relayed by Ethernet switch 303 to the LECS 601.

Step J. The LECS 601 compares the value of E-RN received from end station 107-R to the value of E-RN received earlier from the AS 701.

If the Values Match

Step K. The LECS 601 consults its own internal tables to determine that end station 107-R is associated with the red VLAN managed by LES 602-R. LECS 601 sends a "Notify" message to LES 602-R indicating that end station 107-R is attempting to join the red VLAN; this indication includes the MAC address of end station 107-R.

Step L. The LECS 601 then sends the identity of LES 602-R in a "ConfigResp" message, responding to the original query from Ethernet switch 303 at step D.

Step M. If it does not currently have an ATM virtual connection to LES 602-R, Ethernet switch 303 creates such a connection through ATM switch 401 using standard ATM signalling techniques. Ethernet switch 303 then sends a "JoinRqst" message for end station 107-R over this virtual connection to LES 602-R.

Step N. Upon receipt of this registration message, LES 602-R enters the MAC address of end station 107-R into its internal tables and records the identity of Ethernet switch 303 as the switch serving end station 107-R. LES 602-R sends a "JoinAck" message to Ethernet switch 303 acknowledging successful registration of end station 107-R as a member of the red VLAN.

Step O. When Ethernet switch 303 receives the acknowledgement to its registration request, it updates its internal tables to associate end station 107-R with the red VLAN managed by LES 602-R.

If the Values do not Match

Step K'. The LECS 601 sends a response to Ethernet switch 303 indicating that network access is denied to end station 107-R (not shown).

Step L'. Ethernet switch 303 discards all frames received from end station 107-R and does not forward any frames to end station 107-R, thus isolating end station 107-R from the network.

A second form of security attack involves a bogus Ethernet switch that attempts to extract information from a network by posing as a LAN emulation configuration server or as an authentication server. For example, if the above procedures are followed by a new end station genuinely authorized to enter the red VLAN, the bogus Ethernet switch can, without actually comparing the encrypted random numbers, pretend to give the new end station permission to enter the red VLAN. From the new end station's point of view, having expected to be "let in" from the start, it begins an exchange of restricted information that is now intercepted by the bogus Ethernet switch.

Figure 4:
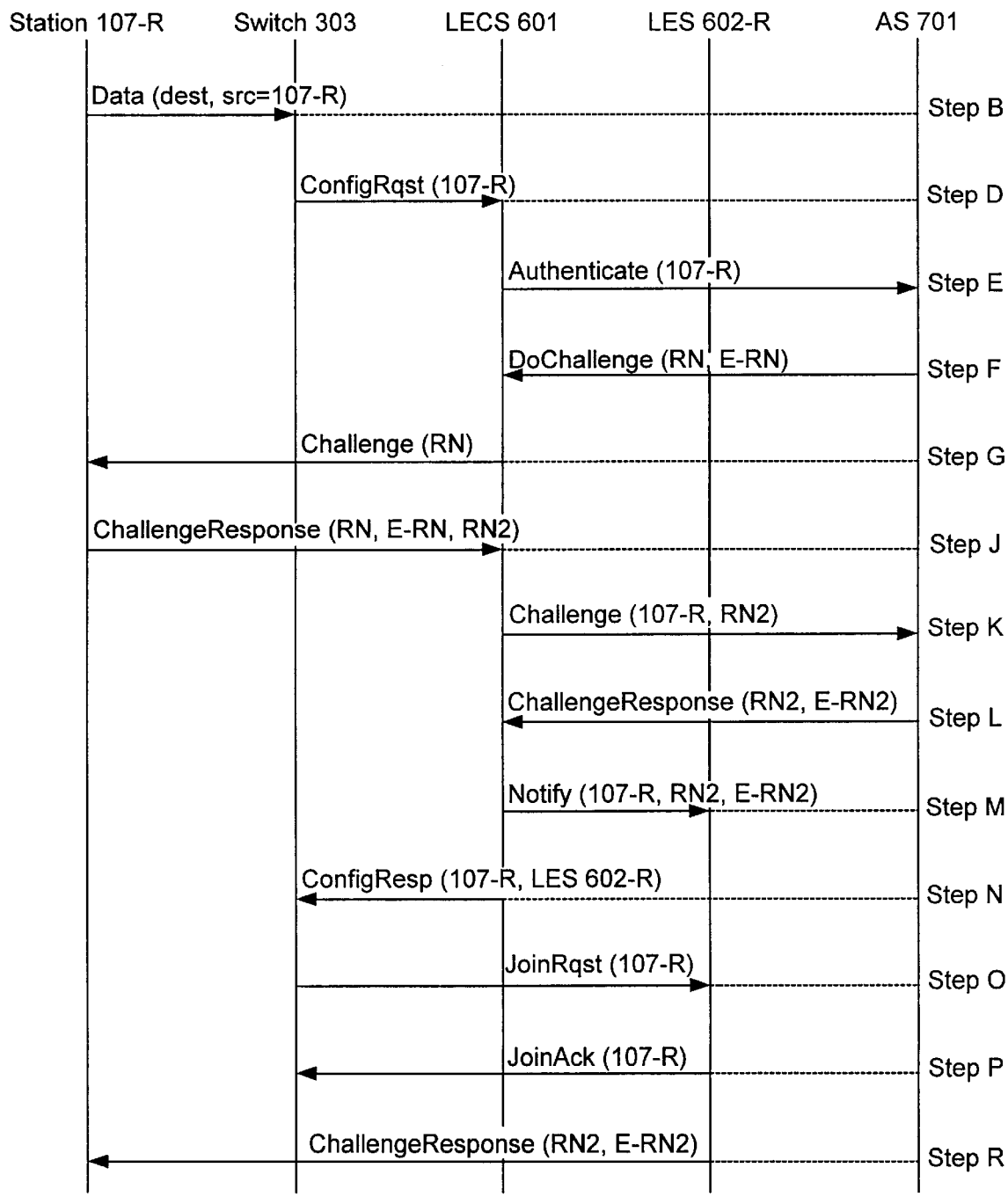
FIG. 4 is a message flow diagram representing end station and network authentication in the network of FIG. 2.

To counter this attack, the new end station may, upon responding to the challenge issued by the network, administer its own test to verify authenticity of the issuer of the original challenge. Considering the network of FIG. 2 and with reference to FIG. 4, the following sequence of steps not only provides network security by verifying legitimacy of a new end station 107-R upon entering the network, but allows (legitimate) new end station 107-R to protect itself from bogus test administrators.

Step A. End station 107-R constructs an Ethernet frame consisting of a frame header comprising a destination address and a source address (e.g., the MAC address of end station 107-R), as well as data to be exchanged. The destination address may be the MAC address of the destination end terminal or a known broadcast address.

Step B. End station 107-R transmits the frame over Ethernet link 207 to Ethernet switch 303 in the form of a "Data" message, using the CSMA-CD protocol.

Step C. Ethernet switch 303 extracts the source address (the MAC address of end station 107-R) from the Ethernet frame and consults an internal table to determine the virtual LAN (and LES) associated with the source address.

Step D. If Ethernet switch 303 cannot find an associated LES by consulting its internal table, Ethernet switch 303 sends a query, in the form of a "ConfigRqst" message, to the LECS 601 asking for the identity of the LES associated with end station 107-R.

Step E. LECS 601 sends an "Authenticate" message to AS 701 requesting authentication of end station 107-R.

Step F. Using a challenge-response authentication algorithm, AS 701 generates a plain number, such as a random number RN, and encrypts it using a secret key known only to the AS 701 and end station 107-R to produce E-RN. Both RN and E-RN are returned to the LECS 601 as a "DoChallenge" message. The secret key used to generate E-RN is never revealed by the AS 701.

Step G. The LECS 601 creates a frame containing a challenge to end station 107-R that includes RN received from AS 701 but does not include E-RN. The frame is then sent in a "Challenge" message from the LECS 601 to the Ethernet switch 303 and subsequently relayed to end station 107-R.

Step H. End station 107-R encrypts RN received in the challenge using its secret key and the same authentication algorithm used by the AS 701.

Step I. End station 107-R generates a second plain number, such as a random number RN2, and encrypts it using its secret key to produce E-RN2.

Step J. End station 107-R responds to the challenge with a "ChallengeResponse" message that includes RN received from LECS 601, along with RN2 and its version of E-RN, but does not include E-RN2. The challenge response is relayed by Ethernet switch 303 to LECS 601.

Step K. After first ensuring that end station 107-R is legitimate by verifying that the value of E-RN received from end station 107-R matches the value of E-RN received from AS 701, LECS 601 sends a "Challenge" message to AS 701 that includes RN2 and the MAC address of end station 107-R.

Step L. AS 701 encrypts RN2 received in the challenge using the authentication algorithm and the secret key for end station 107-R and returns its version of E-RN2 to LECS 601 in the form of a "ChallengeResponse" message.

Step M. LECS 601 consults its own internal tables to determine that end station 107-R is associated with the red VLAN managed by LES 602-R. LECS 601 sends a "Notify" message LES 602-R indicating that end station 107-R is attempting to join the red VLAN; this indication includes the MAC address of end station 107-R, the random number RN2 received in the challenge from end station 107-R and the encrypted random number E-RN2 calculated by AS 701.

Step N. The LECS 601 then sends the identity of LES 602-R in a "ConfigResp" message, responding to the original query from Ethernet switch 303 at Step D.

Step O. If it does not currently have an ATM virtual connection to LES 602-R, Ethernet switch 303 creates such a connection through ATM switch 401 using standard ATM signalling techniques. Ethernet switch 303 then sends a "JoinRqst" message for end station 107-R over this virtual connection to LES 602-R.

Step P. Upon receipt of this registration message, LES 602-R enters the MAC address of end station 107-R into its internal tables and records the identity of Ethernet switch 303 as the switch serving end station 107-R. LES 602-R sends a "JoinAck" message to Ethernet switch 303 acknowledging successful registration of end station 107-R as a member of the red VLAN.

Step Q. When Ethernet switch 303 receives the acknowledgement to its registration request, it updates its internal tables to associate end station 107-R with the red VLAN managed by LES 602-R.

Step R. Using the information received from LECS 601, LES 602-R also sends a "ChallengeResponse" message to end station 107-R, via Ethernet switch 303, that includes the random number RN2 generated by end station 107-R and the encrypted random number E-RN2 calculated by the AS 701.

Step S. When the challenge response is received, end station 107-R compares the value of E-RN2 received from LES 602-R with the value computed locally. If the values match, end station 107-R is assured that the network connection is legitimate.

It is to be understood that alternate embodiments of the present invention exist in which ATM switches are not employed, eliminating any requirement for a LAN emulation configuration server or LAN emulation servers. In such a case, a specific member of each VLAN would be designated as the "VLAN server" and configuration of the network could easily be relegated to the authentication server. The entire authentication procedure could be accomplished by communication between the authentication server and the designated VLAN servers.

While the preferred embodiment of the invention has been described and illustrated it will be apparent to one skilled in the art that variations in the design may be made. The scope of the invention, therefore, is only to be limited by the claims appended hereto.

We claim:

1. A local area network, comprising a plurality of end stations and a authentication server, the LAN being segmented into a plurality of virtual local area networks (VLANs), each VLAN comprising at least one member end station, wherein the authentication server keeps track of which end stations are members of which VLAN, keeps track of which end stations are authorized to join which VLAN and administers an authentication test to new end stations joining a VLAN.

2. The local area network of claim 1 being a token ring LAN.

3. The local area network of claim 1 being an Ethernet LAN.

4. The local area network of claim 3 further comprising a plurality of Ethernet switches, each switch communicating with at least one end station through an Ethernet communication link.

5. A local area network, comprising:
a plurality of end stations;
a plurality of LAN emulation server (LESs);
a LAN emulation configuration server (LECS); and
an authentication server (AS);
the LAN being segmented into a plurality of virtual local area networks (VLANs), each VLAN comprising a respective LES and at least one member end station, each LES keeping track of which end stations are members in the respective VLAN, the LECS keeping track of which end stations are members of which VLAN;
wherein the authentication server keeps track of which end stations are authorized to join which VLAN and administers an authentication test to new end stations joining a VLAN.

6. The local area network of claim 5, wherein the LECS is merged with the AS.

7. The local area network of claim 5 being a token ring LAN.

8. The local area network of claim 5 being an Ethernet LAN.

9. The local area network of claim 8 further comprising a plurality of Ethernet switches, each switch communicating with at least one end station through an Ethernet communication link.

10. The local area network of claim 9, wherein the Ethernet switches communicate with each other through an ATM link.

11. A method for securely adding a new station to a local area network (LAN), the LAN comprising a plurality of end stations and an authentication server (AS), the LAN being segmented into a plurality of virtual local area networks (VLANs), each VLAN comprising at least one member end station, wherein the authentication server keeps tracks of which end stations are members of which VLAN, keeps track of which end stations are permitted to join which VLAN and performs authentication of end stations joining a VLAN, the method comprising:
the new end station sending to the AS a message identifying both the new end station and a desired VLAN;
the new end station taking an authentication test administered by the AS; and
upon successful authentication of the new end station, the AS sending to the new end station a message indication that the new end station has been permitted to join the desired VLAN.

12. The method of claim 11, wherein the new end station is identified by a 48-bit media access control address.

13. The method of claim 11, wherein the new end station is identified by a 32- bit Internet Protocol address.

14. The method of claim 11, wherein the new end station is identified by a physical port on an Ethernet switch.

15. The method of claim 11, wherein the authentication test consists of:
the AS generating a first encrypted number using a plain number and an algorithm known to the AS and to the new end station;
the AS sending to the new end station a message comprising the plain number;
the new end station generating a second encrypted number using the plain number and the algorithm;
the new end station sending to the AS a message comprising the plain number and the second encrypted number; and
the AS comparing the first encrypted number to the second encrypted number;
wherein authentication of the new end station is said to have been successful if the first and second encrypted numbers are identical.

16. The method of claim 15, wherein the plain number is a random number.

17. The method of claim 15, wherein the algorithm is a key-based encryption algorithm.

18. A method for securely adding a new end station to a local area network (LAN), the LAN comprising a plurality of end stations, a plurality of LAN emulation servers (LESs), a LAN emulation configuration server (LECS) and an authentication server (AS), each switch communicating with at least one end station, the new end station being connected to a switch, the LAN being segmented into a plurality of virtual local area networks (VLANs), each VLAN comprising a respective LES and at least one member end station, each LES keeping track of which end stations are currently members in the respective VLAN, the LECS keeping track of which end stations are permitted to be members of which VLAN, wherein the authentication server performs authentication of end stations joining a VLAN, the method comprising:
the new end station sending to its switch a message identifying both the new end station and a desired VLAN;
the switch sending to LECS a message requesting identity of the LES corresponding to the desired VLAN;
the LECS sending to the AS a message requesting authentication of the new end station;
the AS generating a first encrypted number using a plain number and an algorithm known to the AS and to the new end station;
the AS sending to the LECS a message comprising the plain number and the first encrypted number;
the LECS sending to the switch a message comprising the plain number;
the switch sending to the new end station a message comprising the plain number;
the new end station generating a second encrypted number using the plain number and the algorithm;
the new end station sending to the switch a message compising the plain bnumber and the second encrypted number;

the switch sending to the LECS a message comprising the plain number and the second encrypted number;

the LECS comparing the first encrypted number to the second encrypted number;

the LECS sending to the LES corresponding to the desired VLAN a message indicating that the new end station intends to join the desired VLAN;

the LECS sending to the switch a message comprising identity of the LES corresponding to the desired VLAN;

the switch sending to the LES corresponding to the desired VLAN a message requesting that the new end station join the desired VLAN; and the LES corresponding to the desired VLAN sending to the switch a message indicating that the new end station has been allowed to join the desired VLAN.

19. The method of claim 18, wherein the new end station is identified by a 48-bit media access control address.

20. The method of claim 18, wherein the new end station is identified by a 32- bit Internet Protocol address.

21. The method of claim 18, wherein the new end station is identified by a physical port on an Ethernet switch.

22. The method of claim 18, wherein the plain number is a random number.

23. The method of claim 18, wherein the algorithm is a key-based encryption algorithm.

24. A method for securely adding a end station to a local area network (LAN), the LAN comprising a plurality of end stations and an authentication server (AS), the LAN being segmented into a plurality of virtual local area networks (VLANs), each VLAN comprising at least one member end station, wherein the authentication server keeps track of which end stations are members of which VLAN, keeps track of which end stations are permitted to join which VLAN and performs authentication of end stations joining a VLAN, the method comprising:

the new end station sending to the AS a message identifying both the new end station and a desired VLAN;

the AS and the new end station taking an authentication test;

upon successful authentication of the new end station, the AS sending to the new end station a message indicating that the new end station has been permitted to join the desired VLAN; and upon successful authentication of the AS, the new end station joining the desired VLAN.

25. The method of claim 24, wherein the new end station is identified by a 48-bit media access control address.

26. The method of claim 24, wherein the new end station is identified by a 32-bit Internet Protocol address.

27. The method of claim 24, wherein the new end station is identified by a physical port on a Ethernet switch.

28. The method of claim 24, wherein both the AS and the new end station store respective first and second lists of passwords, and the authentication test consists of:

the new end station sending a message to the AS comprising a first password;

the AS comparing the first password to a second password contained in the first list of passwords and sending a message to the new end station comprising a third password; and the new end station comparing the third password to a fourth password contained in the second list of passwords;

wherein authentication of the new end station is said to have been successful if the first and second passwords are identical;

wherein authentication of the AS is said to have been successful if the third and fourth passwords are identical.

29. The method of claim 24, wherein the authentication test consists of:

the AS generating a first encrypted number using a first plain number and an algorithm known to the AS and to the new end station;

the AS sending to the new end station a message comprising the plain number;

the new end station generating a second encrypted number using the plain number and the algorithm;

the new end station generating a third encrypted number using a second plain number and the algorithm;

the new end station sending to the AS a message comprising the first plain number, the second encrypted number and the second plain number;

the AS comparing the first encrypted number to the second encrypted number;

the AS generating a fourth encrypted number from the second plain number;

the AS sending to the new end station a message indicating that the new end station has been allowed to join the desired VLAN;

the AS sending to the new end station a message comprising the second plain number and the fourth encrypted number; and the new end station comparing the third encrypted number to the fourth encrypted number;

wherein authentication of the new end station is said to have been successful if the first and second encrypted numbers are identical;

wherein authentication of the new end station is said to have been successful if the third and fourth encrypted numbers are identical.

30. The method of claim 29, wherein the first and second plain numbers are random numbers.

31. The method of claim 29, wherein the algorithm is a to key-based encryption algorithm.

32. A method for securely adding a new end station to a local area network (LAN), the LAN comprising a plurality of end stations, a plurality of LAN emulation servers (LESs), a LAN emulation configuration server (LECS) and an authentication server (AS), each switch communicating with at least one end station, the new end station being connected to a switch the LAN being segmented into a plurality of virtual local area networks (VLANs), each VLAN comprising a respective LES and at least one member end station, each LES keeping track of which end stations are currently members in the respective VLAN, the LECS keeping track of which end stations are permitted to be members of which VLAN, wherein the authentication server performs authentication of end stations joining a VLAN, the method comprising:

the new end station sending to its switch a message identifying both the new end station and a desired VLAN;

the switch sending to the LECS a message requesting identity of the LES corresponding to the desired VLAN;

the LECS sending to the AS a message requesting authentication of the new end station;

the AS generating a first encrypted number using a first plain number and an algorithm known to the AS and to the new end station;

the AS sending to the LECS a message comprising the first plain number and the first encrypted number;

the LECS sending to the switch a message comprising the first plain number;

the switch sending to the new end station a message comprising the first plain number;

the new end station generating a second encrypted number using the first plain number and the algorithm;

the new end station generating a third encrypted number using the second plain number and the algorithm;

the new end station sending to the switch a message comprising the first plain number, the second encrypted number and the second plain number;

the switch sending to the LECS a message comprising the first plain number, the second encrypted number and the second plain number;

the LECS comparing the first encrypted number to the second encrypted number;

the LECS sending to the AS a message comprising the second plain number;

the AS generating a fourth encrypted number from the second plain number and the algorithm;

the AS sending to the LECS a message comprising the second plain number and the fourth encrypted number;

the LECS sending to the LES corresponding to the desired VLAN a message comprising the second plain number and the fourth encrypted number, and indicating that the new end station intends to join the desired VLAN;

the LECS sending to the switch a message comprising identity of the LES corresponding to the desired VLAN;

the switch sending to the LES corresponding to the desired VLAN a message requesting that the new end station join the desired VLAN;

the LES corresponding to the desired VLAN sending to the switch a message indicating that the new end station has been allowed to join the desired VLAN;

the LES corresponding to the desired VLAN sending to the switch a message comprising the second plain number and the fourth encrypted number;

the switch sending to the new end station a message comprising the second plain number and the fourth encrypted number; and the new end station comparing the third encrypted number to the fourth encrypted number.

33. The method of claim 32, wherein the new end station is identified by a 48-bit media access control address.

34. The method of claim 32, wherein the new end station is identified by a 32-bit Internet Protocol address.

35. The method of claim 32, wherein the new end station is identified by a physical port on an Ethernet switch.

36. The method of claim 32, wherein the first and second plain numbers are random numbers.

37. The method of claim 32, wherein the algorithm is a key-based encryption algorithm.

38. An authentication server (AS) for use in a local area network (LAN) segmented into a plurality of virtual local area networks (VLANs), each VLAN comprising at least one member end station, comprising:

means for keeping track of which end stations are members of which VLAN;

means for keeping track of which end stations are permitted to join which VLAN; and in response to a new end station sending to the AS a message identifying both the new end station and a desired VLAN, means for performing authentication of the new end station by administering a test to the new end station and, upon successful authentication of the new end station, sending to the new end station a message indicating that the new end station has been permitted to join the desired VLAN.

39. An authentication server (AS) as claimers in claim 38, wherein the AS administering the authentication test comprises:

the AS generating a first encrypted number using a plain number and an algorithm known to the AS and to the new end station;

the AS sending to the new end station a message comprising the plain number;

the AS receiving a message comprising the plain number and a second encrypted number; and the AS comparing the first encrypted number to the second encrypted number, wherein authentication of the new end station is said to have been successful if the first and second encrypted numbers are identical.

40. An authentication server (AS) for use in a local area network (LAN) segmented into a plurality of virtual local area networks (VLANS), each VLAN comprising at least one member end station, comprising:

means for keeping track of which end stations are members of which VLAN;

means for keeping track of which end stations are permitted to join which VLAN: and in response to a new end station sending to the AS a message identifying both the new end station and a desired VLAN, means for taking an authentication test together with the new end station and, upon successful authentication of the new end station, the AS sending to the new end station a message indicating that the new end station has been permitted to loin the desired VLAN.

41. An authentication server (AS) as claimed in claim 40, wherein the AS stores a first list of passwords and a second list of passwords and wherein the AS taking the authentication test comprises:

the AS receiving a message comprising a first password;

the AS comparing the first password to a second password contained in the first list of passwords and sending a message to the new end station comprising a third password for authentication of the AS by the new end station;

wherein authentication of the new end station is said to have been successful if the first and second passwords are identical.

42. An authentication server (AS) as claimed in claim 40, wherein the AS taking the authentication test comprises:

the AS generating a first encrypted number using a first plain number and an algorithm known to the AS and to the new end station;

the AS sending to the new end station a message comprising the first plain number;

the AS receiving a message comprising the first plain number, a second encrypted number and a second plain number;

the AS comparing the first encrypted number to the second encrypted number:

the AS generating a third encrypted number from the second plain number;

the AS sending to the new end station a message comprising the second plain number and the third encrypted number, for authentication of the AS by the new end station, wherein authentication of the new end station is said to have been successful if the first and second encrypted numbers are identical.

* * * * *

UNITED STATES PATENT AND TRADEMARK OFFICE
CERTIFICATE OF CORRECTION

PATENT NO. : 6,035,405
DATED : MARCH 7, 2000
INVENTOR(S) : William A. Gage et al.

It is certified that error appears in the above-identified patent and that said Letters Patent is hereby corrected as shown below:

Issued Claim 1:  "a" should read "an"
Issued Claim 5:  "server" should read "servers"
Issued Claim 11: "tracks" should read "track"     "indication" should read "indicating"
Issued Claim 17: "to LECS" should read "to the LECS"
                 "compising" should read "comprising"
                 "bnumber" should read "number"
Issued Claim 24: "a end" should read "a new end"
Issued Claim 31: "Delete the word "to"
                 "switch" should read "switch,"
                 "the" should read "a"
Issued Claim 39: "claimers" should read "claimed"
Issued Claim 40: "VLANS" SHOULD READ "VLANs"
                 "VLAN:" should read "VLAN;"
                 "loin" should read "join"
Issued Claim 42: "number:" should read "number;"

Signed and Sealed this

Twenty-ninth Day of May, 2001

*Attest:*

NICHOLAS P. GODICI

*Attesting Officer*   *Acting Director of the United States Patent and Trademark Office*